Feb. 13, 1940.  J. W. REDFIELD  2,190,083
DISPLAY DEVICE
Filed Nov. 18, 1938
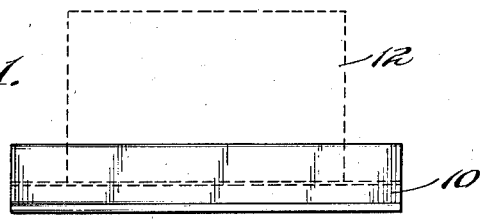
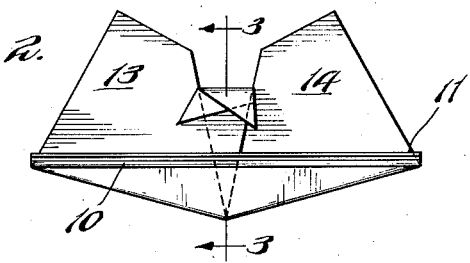
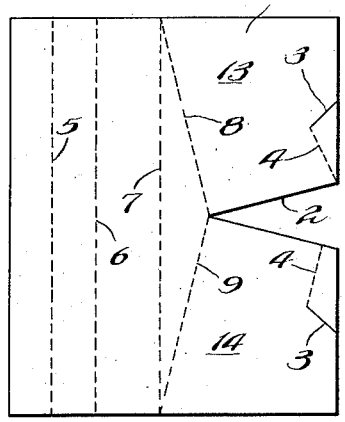
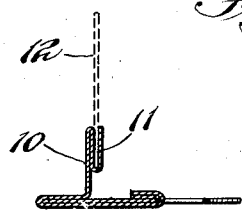
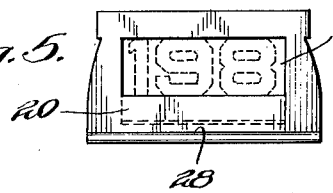
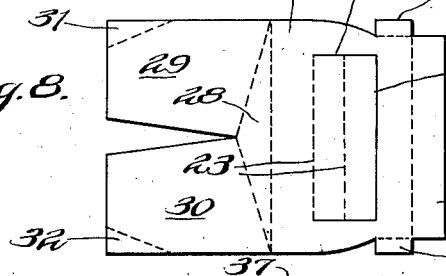
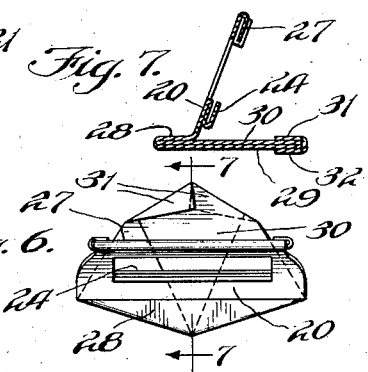
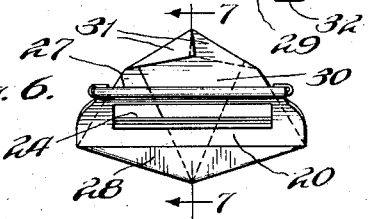
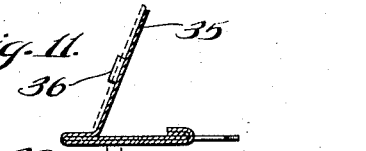
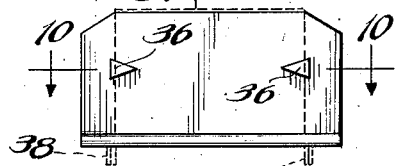
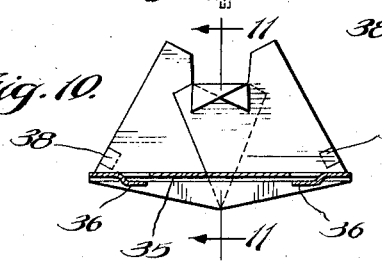
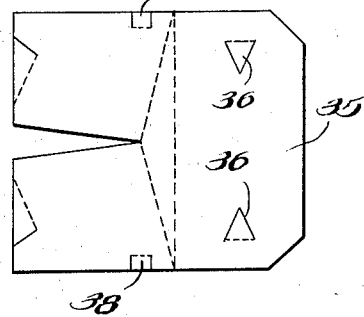
INVENTOR.
James W. Redfield
BY George H. Simmons
ATTORNEY.

Patented Feb. 13, 1940

2,190,083

UNITED STATES PATENT OFFICE 2,190,083

DISPLAY DEVICE

James W. Redfield, Chicago, Ill., assignor to The Tablet & Ticket Co., Chicago, Ill., a corporation of Illinois Application November 18, 1938, Serial No. 241,128

7 Claims. (Cl. 40—152.1)

This invention relates to display devices such as are used on shelves or counters or in show cases or display windows to hold cards or tags displaying the price and other information regarding merchandise displayed, and has for its principal object the provision of a new and improved device of this kind.

It is a main object of the invention to provide a display device capable of being manufactured at low cost and capable of being styled to match the environment in which it is used.

It is a further object of the invention to provide a display device that can be manufactured from a piece of sheet material such as paper or paper backed foil.

It is a further object of the invention to provide a display device that is reenforced by folding the material from which it is made so that a light weight relatively inexpensive stock may be used.

Further objects of the invention not specifically mentioned here will be apparent from the detailed description and claims which follow, reference being had to the accompanying drawing in which a preferred embodiment of the invention is shown by way of example and in which:

Figure 1 is a front elevational view of a preferred form of display device;

Figure 2 is a plan view of the device shown in Figure 1;

Figure 3 is a cross-sectional view through the device taken substantially along the line 3—3 of Figure 2 looking in the direction of the arrows;

Figure 4 is a plan view of the blank from which the device is made;

Figure 5 is a front elevational view of a modified form of device;

Figure 6 is a plan view of the device shown in Figure 5;

Figure 7 is a cross-sectional view of the device taken along the line 7—7 of Figure 6 looking in the direction of the arrows;

Figure 8 is a plan view of the blank from which the device shown in Figures 5, 6 and 7 is formed;

Figure 9 is a front elevational view of another form of device;

Figure 10 is a plan view of the device shown in Figure 9 partly in section taken along the line 10—10 of Figure 9 looking in the direction of the arrows;

Figure 11 is a cross-sectional view taken along the line 11—11 of Figure 10, looking in the direction of the arrows; and Figure 12 is a plan view of the blank from which the form of the device shown in Figures 9, 10 and 11 is made.

In the displaying of merchandise on counters, in show cases or display windows, it is the practice to display a card or tag giving the price and/or other data concerning the merchandise. These tags are frequently held by suitable devices which have heretofore been usually formed of metal, wood or a molded plastic. The card holders thus available are relatively expensive, are not capable of being styled to conform to the environment in which they are used and are bulky and often times distract from the display.

In accordance with the teachings of the present invention, the card holder is formed by cutting and folding a piece of sheet material such as paper or paper backed foil, to form a simple and inexpensive display device. The device consists of three main portions, the first and upstanding portion containing means for holding the card or tag that is to be displayed, the second a foot portion extending forwardly of the upstanding portion, and the third is a base portion extending under the foot portion and rearwardly of the upstanding portion. In accordance with the teachings of the invention, the upstanding portion which holds the cards that are to be displayed can be formed in variety of shapes and sizes and may be made from varied colored materials so as to produce a holder that will add to, rather than distract from, the effectiveness of the display. The materials from which the device is made are relatively cheap so that the device will be very inexpensive.

Referring now to the drawing in more detail, particularly Figures 1 to 4 inclusive, wherein is shown an embodiment of the invention adapted to hold a card in a substantially vertical position, the holder being disposed entirely beneath the card. As shown, the device consists of a sheet of material 1, generally rectangular in shape and having a V-shaped notch 2 cut from one of its edges. Slits 3 converge inwardly towards the apex of the notch 2 and are connected thereto by scores 4 substantially as shown. The blank is likewise scored at 5, 6, 7, 8 and 9, substantially as shown.

The blank thus formed is folded into shape by folding along the score 7 to form a portion 10, Figure 3, which is disposed substantially vertically and upstands from the triangular foot portion between scores 7, 8 and 9. The stock is again folded along the scores 5 and 6 to form a U-shaped portion 11 along the top edge of and in back of the upstanding part 10, which U-shaped portion is adapted to receive a card 12.

A base for the device is formed by folding along scores 8 and 9 to extend the projections 13 and 14 under the foot portion and rearwardly thereof. Since the scores 8 and 9 are set at an angle with respect to the upstanding portion 10 projections 13 and 14 will converge and overlap rearwardly of the upstanding portion 10. The ears formed by slits 3 and scores 4 are folded along the scores 4 back onto the overlapped portions of the projections 13 and 14 to hold these projections fixed relative to each other.

The device so formed is rigid and capable of supporting a sizable card 12 in upstanding position without over-tipping. If desired the upstanding portion 10 and foot portion projecting forwardly therefrom may be decorated with suitable designs printed or embossed thereon to enhance the attractiveness of the display.

In the embodiment of the invention shown in Figures 5, 6, 7 and 8, the upstanding portion 20 of the device is provided with a window 21 in which price indicia may be displayed. This window is formed by cutting the top and end sides of the opening as shown at 22, Figure 8, and then folding the cut away stock along scores 23 to form a generally U-shaped section 24, Figures 6 and 7, that is disposed back of the main portion 20. The top edge 25 of the upstanding portion 20 is scored as shown in Figure 8 and folded over rearwardly along this score and held by ears 26 to form a second U-shaped channel 27. The price indicating numbers are provided with tongues which fit into the channels 24 and 27 to hold the figures in place in the window 21. As shown, the window 21 is rectangular and the outline of the upstanding portion 20 is substantially rectangular. Other shapes are contemplated, the particular one shown being an example only.

The upstanding portion 20 of the device is supported in a substantially vertical position by a foot 28 that extends forwardly therefrom and a base composed of members 29 and 30 which extend under the foot and rearwardly thereof and are overlapped as before. The overlapping portions of the base are held together by folding the portion 31 of the lower projection 29 over on top of the upper projection 30 and by folding the portion 32 of the upper projection 30 under the lower projection 29 as will be best seen in Figures 6 and 7.

In the embodiment of the invention shown in Figures 9 to 12 inclusive, the foot and base portions are made in the same way as the foot and base portions of the embodiment shown in Figures 1 to 4 inclusive and the upstanding portion 35 is provided with tongues 36 that are bent forwardly out of the plane of the portion 35 and serve to hold a card 37 thereagainst. As shown in the drawing, tongues 36 are triangular in shape but it will be apparent that any desired shape of tongue may be used within the spirit of the invention.

If desired, the upstanding portion 36 of the holder may contain a design printed or embossed thereon and price data may be marked directly thereon. The data may be gummed letters and figures pasted on the holder. Tongues 36 may be incorporated in the design or omitted, as desired.

Often times it will be desirable to have the foot and base portion of the device elevated slightly off the support upon which the device is rested. This may be accomplished within the teachings of the invention by forming tongues 38 in the edges of the projections that go to form the base, which tongues are turned down at right angles to the base in the manner shown in Figures 9 and 11 and serve to elevate the forward edge of the device. It will be understood that tongues 38 may be used in connection with the forms of display devices shown in Figures 1 to 8 inclusive as well as with the form of the device shown in Figures 9 to 12.

When made of paper backed metal foil, the display device of the present invention presents a very attractive appearance and there is sufficient elasticity in the material to enable the device to be used a number of times and to be bent and shaped as required without damage to the material and when folded as shown, the device is sufficiently rigid to serve the purposes for which it is intended. The device may be made from either single faced foil paper or double faced foil paper as desired and obviously may be made with a silver, gold or bronze cast by proper choice of stock. Paper colored in pastel shades or in bright colors may likewise be used, if desired, and either kind of stock may be embossed or printed, if desired.

In the drawings I have shown particular shapes of upstanding portions of the device to illustrate the invention but it will be understood that this portion may be made in any desired shape within the teachings of the invention.

Having thus complied with the statutes and shown and described a preferred embodiment of my invention, what I consider new and desire to have protected by Letters Patent is pointed out in the appended claims.

What is claimed is:

1. A display device comprising a piece of sheet material having a top portion bent to form a planar upstanding member adapted to hold a card, an intermediate portion extending forwardly of said member, two bottom portions each bent at an angle with respect to said member and extended under said intermediate portion and member, said bottom portions overlapping each other rearwardly of said member, and means engaging said overlapping portions for holding the same together.

2. A display device comprising a piece of sheet material having a main portion cut and scored to form card holding means, a triangular intermediate portion joined at its base to said main portion, a projection extending from each of the other two sides of said intermediate portion, said main portion being folded with respect to said intermediate portion so as to upstand from the rear edge thereof and being folded with respect to itself so as to hold a card, said projections being folded to extend under and rearwardly of said intermediate portion and to overlap rearwardly of said main portion, and an ear on each projection bent over the other projection to hold said overlapping projections together.

3. A display device formed from a piece of sheet material comprising a main portion folded to form an upstanding display receiving member, a triangular foot portion extending forwardly from the bottom of said member, projections of said triangular foot portion folded thereunder and extending rearwardly therefrom, said projections overlapping in back of said member, and tongues folded out of said projections over the overlapping portions for holding said portions together.

4. A display device formed from a piece of sheet material comprising a main portion folded to form an upstanding planar support, a foot extending forwardly of said support, projections of said foot folded thereunder and extending rearwardly therefrom, said projections overlapping in back of said support, and means engaging said overlapping portions for holding the same together.

5. A display device formed from a piece of sheet material comprising, an upstanding main portion, there being a window cut in said portion, the cutaway part being folded down in back of said portion and then folded upwardly to form a groove, the top free edge of said portion being folded down in back of the portion to form a second groove, said grooves being adapted to support card means in said window, a foot portion extending forwardly of said main portion, projections of said foot extending under the same and rearwardly of said main portion, said projections overlapping behind said main portion, and tongues folded over said overlapping projections for holding the same together.

6. A display device formed from a piece of sheet material comprising, an upstanding portion, tongues bent out of said portion to hold a card thereon, a triangular foot portion extending forwardly from the bottom of said upstanding portion, projections of said triangular portion folded under said foot portion and converging into overlapped relation rearwardly of said upstanding portion, means for holding together said overlapped projections, and tongues bent downwardly from said projections to raise said foot portion.

7. A display device formed from a piece of sheet material comprising a planar upstanding portion adapted to support a card, a foot extending forwardly of said support, projections of said foot extending thereunder and rearwardly therefrom, said projections overlapping each other in back of said upstanding portion, and means on each projection engaging the other projection for holding together said overlapping portions.

JAMES W. REDFIELD.